(12) United States Patent
Hunt

(10) Patent No.: US 11,486,424 B2
(45) Date of Patent: Nov. 1, 2022

(54) VALVE ASSEMBLIES INCORPORATING SOLENOID CLIPS AND METHODS OF ASSEMBLING THE SAME

(71) Applicant: ALLISON TRANSMISSION, INC., Indianapolis, IN (US)

(72) Inventor: Mickey Hunt, Camby, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 188 days.

(21) Appl. No.: 16/682,323

(22) Filed: Nov. 13, 2019

(65) Prior Publication Data

US 2021/0140454 A1    May 13, 2021

(51) Int. Cl.
*F16B 2/24*       (2006.01)
*F16K 31/06*      (2006.01)
*F16H 59/04*      (2006.01)

(52) U.S. Cl.
CPC .......... *F16B 2/245* (2013.01); *F16K 31/0675* (2013.01); *F16H 59/045* (2013.01)

(58) Field of Classification Search
CPC ...... F16B 2/245; F16K 31/0675; F16K 31/06; F16H 59/045
USPC ......... 248/27.3, 74.2, 229.16, 229.26, 228.7, 248/230.7, 231.81, 316.723, 1.81; 335/296
See application file for complete search history.

(56) References Cited

U.S. PATENT DOCUMENTS

| | | | |
|---|---|---|---|
| 2,513,965 A * | 7/1950 | Pettit | H01F 5/00 248/309.2 |
| 3,536,281 A * | 10/1970 | Attore | F16L 3/24 24/339 |
| 3,727,160 A | 4/1973 | Churchill | |
| 4,100,519 A | 7/1978 | Neff | |
| 4,649,360 A | 3/1987 | Riefler et al. | |
| D294,800 S | 3/1988 | Nilsson | |
| D308,936 S | 7/1990 | Arner | |
| 5,025,682 A * | 6/1991 | McCabe | F16B 21/186 74/606 R |

(Continued)

FOREIGN PATENT DOCUMENTS

| CN | 202067622 U | 12/2011 |
|---|---|---|
| CN | 203614873 U | 5/2014 |

(Continued)

OTHER PUBLICATIONS

English translation of WO2013037513A1; Schaeffler Technologies AG & Co. et al. (Year: 2013).*

(Continued)

*Primary Examiner* — Muhammad Ijaz
(74) *Attorney, Agent, or Firm* — Taft Stettinius & Hollister LLP; Stephen F. Rost

(57) ABSTRACT

Valve assemblies, clips adapted for use in valve assemblies, and methods of assembling valve assemblies are disclosed herein. A valve assembly includes a solenoid, a valve body, and a clip. The valve body is coupled to the solenoid and extends along a valve body axis. The valve body includes a first inner surface that defines an interior passage, a second inner surface that defines a groove in fluid communication with the interior passage, and a shoulder defined at an interface between the first inner surface and the second inner surface. The clip is coupled to the solenoid and the valve body.

15 Claims, 4 Drawing Sheets

(56) References Cited

U.S. PATENT DOCUMENTS

| | | | |
|---|---|---|---|
| D323,453 S | 1/1992 | Walther | |
| 5,581,222 A | 12/1996 | Pinaud | |
| 5,603,482 A | 2/1997 | Mott et al. | |
| 5,826,836 A * | 10/1998 | Gallichan | B60R 11/02 |
| | | | 248/231.9 |
| D464,323 S | 10/2002 | Harasawa et al. | |
| D516,038 S | 2/2006 | Liao et al. | |
| D548,668 S | 8/2007 | Walton et al. | |
| D564,347 S | 3/2008 | Limber | |
| 7,503,401 B2 | 3/2009 | Gross et al. | |
| D605,600 S | 12/2009 | Liao et al. | |
| D645,827 S | 9/2011 | Lee et al. | |
| 8,430,378 B2 | 4/2013 | Hutchings et al. | |
| 9,478,341 B2 | 10/2016 | Qin et al. | |
| 9,851,003 B2 | 12/2017 | Keller | |
| 10,030,785 B2 | 7/2018 | Jung et al. | |
| D839,994 S | 2/2019 | Cole et al. | |
| 2012/0025938 A1 * | 2/2012 | Adler | H01F 7/1607 |
| | | | 335/296 |
| 2012/0153043 A1 * | 6/2012 | Arekar | F16K 31/086 |
| | | | 239/200 |
| 2018/0073657 A1 | 3/2018 | Jung et al. | |
| 2019/0178410 A1 | 6/2019 | Kurz et al. | |

FOREIGN PATENT DOCUMENTS

| | | |
|---|---|---|
| CN | 203753124 U | 8/2014 |
| CN | 104647272 B | 6/2016 |
| JP | H11304030 A | 11/1999 |
| WO | 2013037513 A1 | 3/2013 |
| WO | 2018130340 A1 | 7/2018 |

OTHER PUBLICATIONS

AC Delco 34890 BKT Bracket, Solenoid Clip, Nov. 11, 2019, https://www.amazon.com/Delco-34890-Bracket-Solenoid-Clip/dp/B071W37DDB, 5 pages.

1964-1970 Mustang Solenoid Harness Clip, Custom Mustangs, Nov. 11, 2019, https://www.custommustangs.com.au/64-70-solenoid-harness-clip, 12 pages.

* cited by examiner

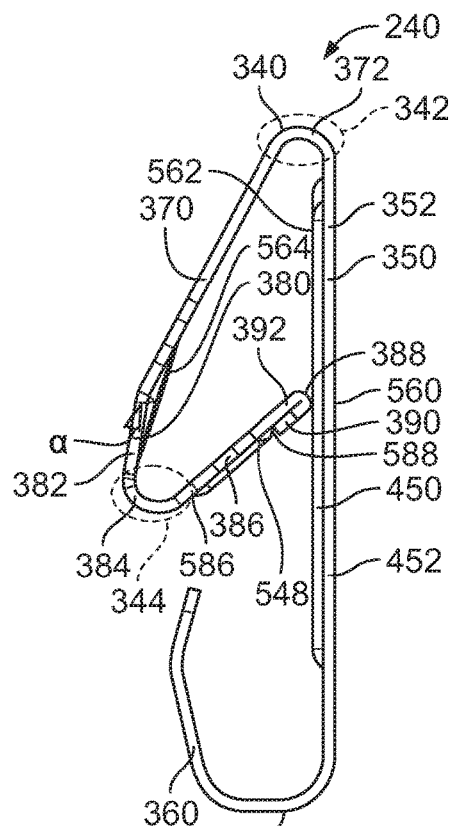
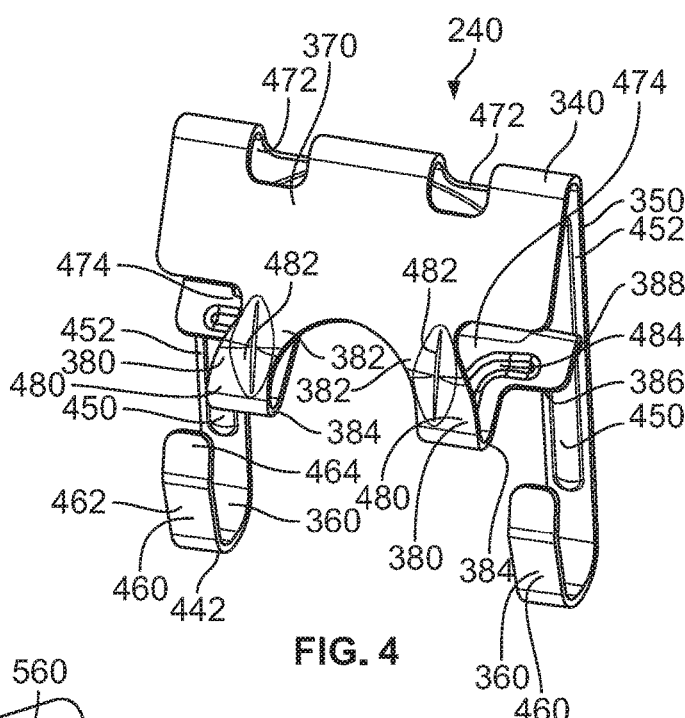
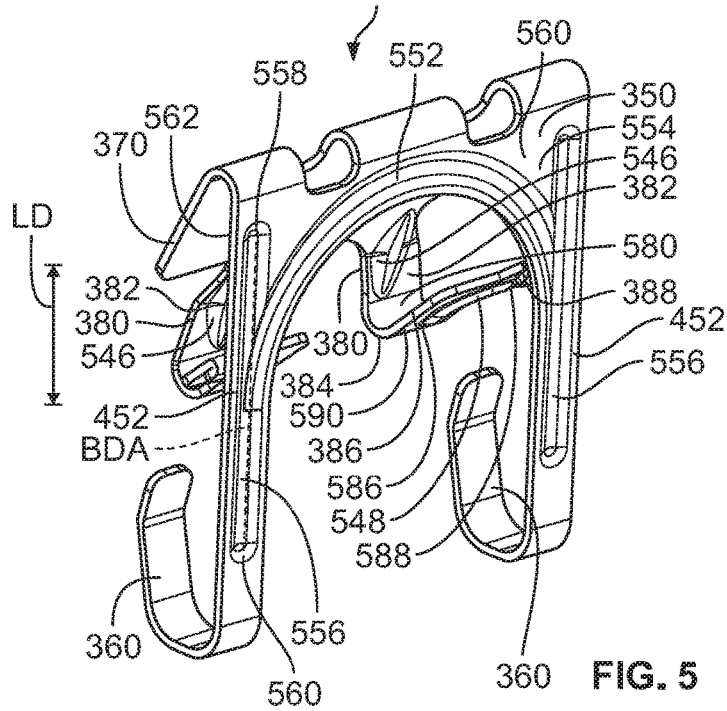

VALVE ASSEMBLIES INCORPORATING SOLENOID CLIPS AND METHODS OF ASSEMBLING THE SAME

FIELD OF THE DISCLOSURE

The present disclosure relates, generally, to valve assemblies for transmissions, and, more specifically, to valve assemblies for transmissions that incorporate solenoids.

BACKGROUND

Some valve assemblies may incorporate one or more retainers to locate one component relative to another component. In some cases, designs constraints and/or manufacturing tolerances may undesirably impact the size and/or performance of such valve assemblies. Additionally, in some cases, forces applied to the one or more retainers may cause, or otherwise be associated with, undesirable movement of the components located by the one or more retainers relative to one another. Accordingly, valve assemblies that avoid the shortcomings associated with conventional configurations remain an area of interest.

SUMMARY

The present disclosure may comprise one or more of the following features and combinations thereof.

According to one aspect of the present disclosure, a valve assembly may include a solenoid, a valve body, and a clip. The valve body may extend along a valve body axis and be coupled to the solenoid. The valve body may include a first inner surface that defines an interior passage, a second inner surface that defines a groove in fluid communication with the interior passage, and a shoulder defined at an interface between the first inner surface and the second inner surface. The clip may be coupled to the solenoid and the valve body. The clip may be arranged in contact with the solenoid to cause the solenoid to abut the shoulder of the valve body such that the solenoid is constrained against movement along the valve body axis toward the interior passage.

In some embodiments, the interior passage may have a first diameter, the groove may have a second diameter greater than the first diameter, and a locating block of the solenoid may be sized to be positioned in the groove such that the locating block abuts the shoulder of the valve body. The locating block may be spaced from a block projection of the solenoid to define a gap therebetween, and the clip may be retained in the gap in engagement with the block projection. The valve body may include a chamfer to facilitate insertion of the clip into the gap.

In some embodiments, the clip may include a spine and a pair of generally C-shaped tangs appended to the spine, each tang may include a valve body engagement surface that contacts an exterior surface of the valve body, and part of each valve body engagement surface may extend parallel to the exterior surface. The clip may include an overhang appended to the spine opposite the pair of tangs and a pair of tabs interconnected with the overhang, each tab may include a solenoid engagement surface that contacts a locating block of the solenoid, and part of each solenoid engagement surface may extend parallel to, and be in contact with, a rear surface of the locating block. Each tab may include a tip interconnected with the solenoid engagement surface by a bend, and each tab may extend inwardly toward the spine from the bend to the tip. The tip of each tab may include a first portion folded over a second portion to provide a generally smooth contour.

In some embodiments, the clip may include a spine, a pair of generally C-shaped tangs appended to the spine, an overhang appended to the spine opposite the pair of tangs, and a pair of tabs interconnected with the overhang that extend inwardly toward the spine. The overhang may include a pair of slots to facilitate flexion of the clip in use of the valve assembly, and the spine may include a stiffener bead that extends outwardly toward each tab and provides increased stiffness to the clip. The pair of tabs may be arranged in contact with the stiffener bead.

According to another aspect of the present disclosure, a clip adapted for use in a valve assembly may include a spine, a pair of generally C-shaped tangs, an overhang, and a pair of tabs. The pair of generally C-shaped tangs may be appended to the spine. The overhang may be appended to the spine opposite the pair of tangs. The pair of tabs may extend inwardly toward the spine and be interconnected with the overhang. In use of the clip, the pair of tabs may be configured to contact a solenoid of the valve assembly to cause the solenoid to abut a shoulder of a valve body of the valve assembly.

In some embodiments, the spine may include a stiffener arch to provide increased stiffness to the clip. The spine may include a stiffener bead arranged opposite the stiffener arch that extends outwardly toward each tab and provides increased stiffness to the clip.

In some embodiments, each tab may include a stiffener dart to provide increased stiffness to the clip that is formed on a first exterior surface of the tab at least partially facing toward the spine. Each tab may include a stiffener bead to provide increased stiffness to the clip that is formed on a second exterior surface of the tab arranged opposite the first exterior surface.

In some embodiments, the overhang may include a pair of slots to facilitate flexion of the clip in use thereof, each tab may include an arcuate bend and a tip interconnected with the arcuate bend, each tab may extend inwardly toward the spine from the bend to the tip, the tip of each tab may include a first portion folded over a second portion to provide a generally smooth contour, and the tip may be configured for slidable engagement with the spine in use of the clip.

According to yet another aspect of the present disclosure, a method of assembling a valve assembly including a solenoid, a valve body having a first inner surface defining an interior passage, a second inner surface defining a groove in fluid communication with the interior passage, and a shoulder defined at an interface between the first inner surface and the second inner surface, and a clip may include positioning the solenoid in proximity to the valve body such that a locating block of the solenoid is at least partially received by the groove, inserting the clip into a gap defined between a chamfer of the valve body and the solenoid, and advancing the clip through the gap such that the clip is arranged in contact with the solenoid and the valve body. Advancing the clip through the gap such that the clip is arranged in contact with the solenoid and the valve body may include contacting the solenoid with the clip to cause the solenoid to abut the shoulder of the valve body to locate the solenoid relative to the valve body.

In some embodiments, advancing the clip through the gap such that the clip is arranged in contact with the solenoid and the valve body may include bending the clip at a first bending region cooperatively defined by a spine of the clip and an overhang of the clip interconnected with the spine and at a second bending region defined by a pair of tabs of the clip interconnected with the overhang and extending toward the spine. Advancing the clip through the gap such that the clip is arranged in contact with the solenoid and the valve body may include engaging the pair of tabs with the solenoid and slidably engaging the pair of tabs with the spine.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 is a side elevation view of a clip included in the valve assembly of FIG. 1;

FIG. 4 is a front perspective view of the clip shown in FIG. 3;

FIG. 5 is a rear perspective view of the clip shown in FIG. 3;

DETAILED DESCRIPTION

Figure 1:
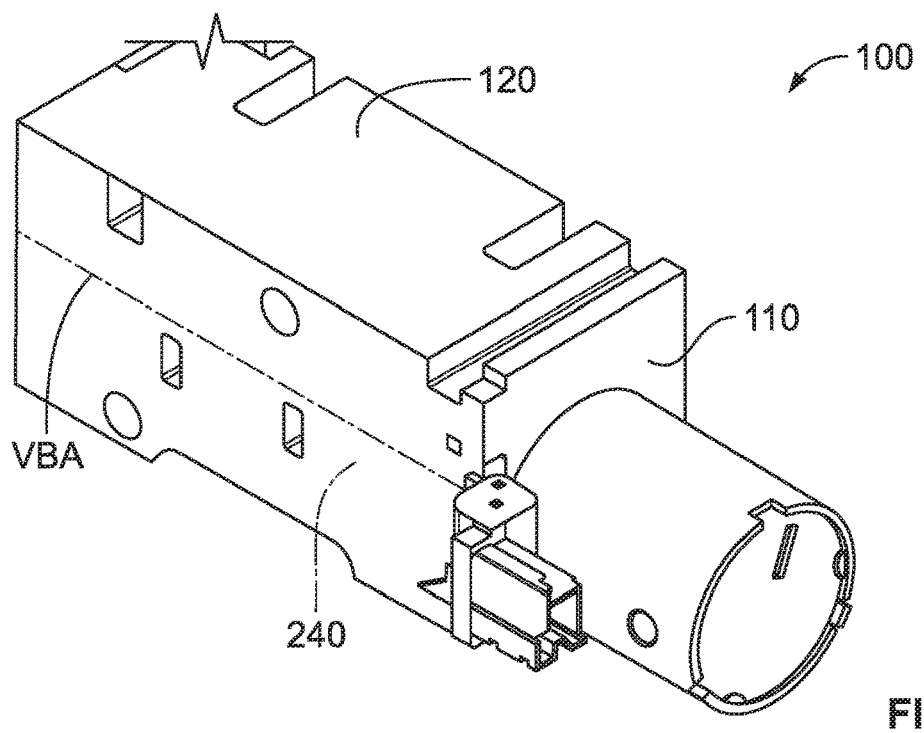
FIG. 1 is a perspective view of a valve assembly for a transmission.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative valve assembly 100 is adapted for use in a transmission (not shown) of a vehicle. In the illustrative embodiment, the valve assembly 100 is embodied as, or otherwise includes, a trim valve assembly that is adapted to deliver pressurized fluid (e.g., hydraulic fluid) to one or more fluid demand device(s) during one or more transmission operating mode(s). It should be appreciated that the one or more fluid demand device(s) may be embodied as, or otherwise include, one or more logic valve(s), shift valve(s), accumulator(s), orifice(s), rotating torque transmitting device(s) (e.g., clutches), stationary braking device(s) (e.g., brakes), regulator(s), manifold(s), conduit(s), reservoir(s), or the like. Furthermore, it should be appreciated that the valve assembly 100 may be fluidly coupled with the one or more fluid demand device(s) as components of a hydraulic circuit (e.g., an electro-hydraulic control circuit) included in a transmission. For the sake of simplicity and brevity, discussion of fluidic couplings and/or connections between the valve assembly 100 and the one or more fluid demand device(s) is omitted.

It should be appreciated that the illustrative valve assembly 100 is adapted for use in one or more vehicles employed in a variety of applications, among other things. In some embodiments, the valve assembly 100 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the valve assembly 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

Figure 2:
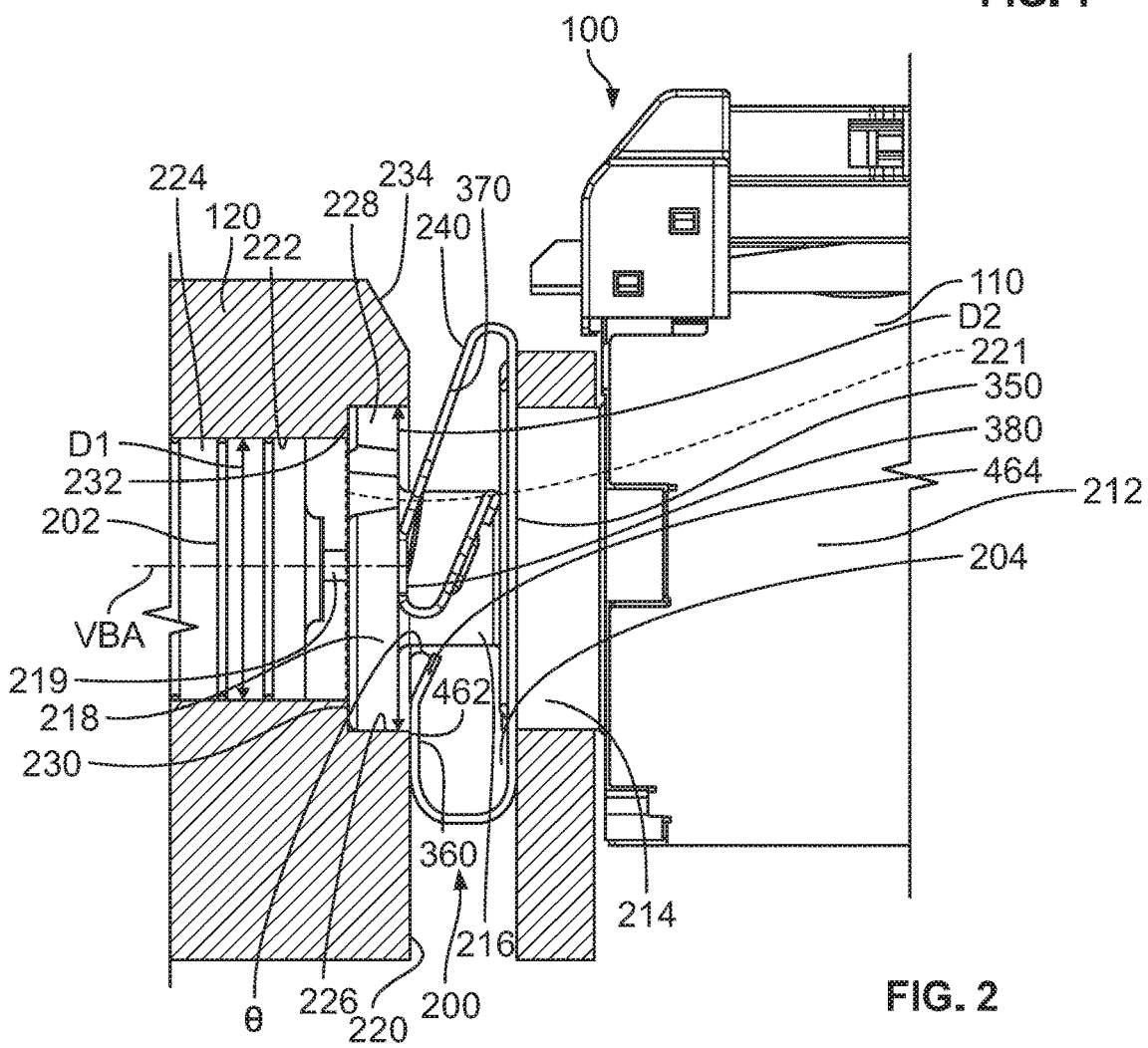
FIG. 2 is a sectional view of the valve assembly of FIG. 1 taken about line 2-2.

The illustrative valve assembly 100 includes a solenoid 110, a valve body 120, and a clip 240 (see FIG. 2). As will be apparent from the discussion that follows, in the illustrative embodiment, the solenoid 110 is received by, and retained by the clip 240 in engagement with, the valve body 120 when the valve assembly 100 is assembled as shown in FIG. 2. As a result of being retained by the clip 240, the solenoid 110 abuts the valve body 120 and is constrained against movement in one direction along a valve body axis VBA, as described in greater detail below. Direct contact and/or engagement between the solenoid 110 and the valve body 120 may locate the solenoid 110 relative to the valve body 120 in a consistent and reproducible fashion while minimizing axial float of the solenoid 110 relative to the valve body 120 in at least one direction in use of the valve assembly 100. Additionally, direct contact and/or engagement between the solenoid 110 and the valve body 120 may facilitate, or otherwise be associated with, reduced manufacturing tolerances and/or reduced design constraints compared to other configurations.

Referring now to FIG. 2, the valve assembly 100 is depicted in an assembled configuration 200. In the assembled configuration 200 of the valve assembly 100, the valve body 120 is coupled to the solenoid 110 and the clip 240 is coupled to the solenoid 110 and the valve body 120. The valve body 120 extends along the valve body axis VBA and includes an inner surface 222, an inner surface 226 spaced from the inner surface 222 along the valve body axis VBA, and a shoulder 230. The inner surface 222 defines an interior passage 224 and the inner surface 226 defines a groove 228 in fluid communication with the interior passage 224. The shoulder 230 is defined at an interface 232 between the inner surface 222 and the inner surface 226. The clip 240 is arranged in contact with the solenoid 110 to cause the solenoid 110 to abut the shoulder 230 of the valve body 120 such that the solenoid 110 is constrained against movement along the valve body axis VBA toward the interior passage 224.

In the illustrative embodiment, the solenoid 110 is embodied as, or otherwise includes, any device or collection of devices (e.g., electromagnets) capable of producing a controlled magnetic field through which electric current may be passed in use of the valve assembly 100. In some embodiments, the solenoid 110 may be embodied as, or otherwise include, one or more transducer(s) or the like capable of converting electrical energy into linear motion to actuate one or more components of the valve assembly 100, such as a spool 202 arranged for axial movement within the interior passage 224, for example. In such embodiments, the valve assembly 100 may be embodied as, or otherwise include, a solenoid valve assembly.

The illustrative solenoid 110 includes a cylindrical housing 212, a block projection 214, a bar 216, a locating block 218, and a pin 219. The cylindrical housing 212 is configured to house one or more coil(s), electromagnet(s), or the like. The block projection 214 extends outwardly away from the housing 212 and is interconnected with the bar 216. The bar 216 is interconnected with the locating block 218 and arranged between the locating block 218 and the block projection 214. As discussed below, the locating block 218 is sized to be positioned in the groove 228 such that the locating block 218 abuts the shoulder 230. The locating block 218 therefore provides a locating feature that may be used in conjunction with the clip 240 to locate the solenoid 110 relative to the valve body 120 during assembly of the valve assembly 100. The pin 219 is interconnected with the locating block 218 and configured to extend into the interior passage 224 along the valve body axis VBA. Additionally, in some embodiments, the pin 219 may be configured to retract away from the interior passage 224 toward the groove 228 along the valve body axis VBA.

In the illustrative embodiment, the valve body 120 is configured to house the spool 202 within the interior passage 224 such that the spool 202 is movable along the valve body axis VBA to a number of discrete, predetermined positions. It should be appreciated that those positions may define, or otherwise be associated with, multiple operational states of the valve assembly 100. Furthermore, it should be appreciated that movement of the spool 202 along the valve body axis VBA between those positions may control delivery of fluid to various ports (not shown) formed in the valve body 120 during multiple operational states of the valve assembly 100 to selectively provide fluid to one or more fluid demand device(s).

The illustrative interior passage 224 of the valve body 120 has a diameter D1 as shown in FIG. 2. The groove 228 of the valve body 120 has a diameter D2. In the illustrative embodiment, the diameter D2 is greater than the diameter D1 such that the shoulder 230 is defined at the interface 232 between the inner surfaces 222, 226. In the assembled configuration 200 of the valve assembly 100, the clip 240 extends into the groove 228 and contacts the locating block 218 positioned therein to urge the locating block 218 against the shoulder 230. Therefore, the groove 228 is sized to at least partially receive the clip 240 when the valve assembly 100 is in the assembled configuration 240.

Figure 6:
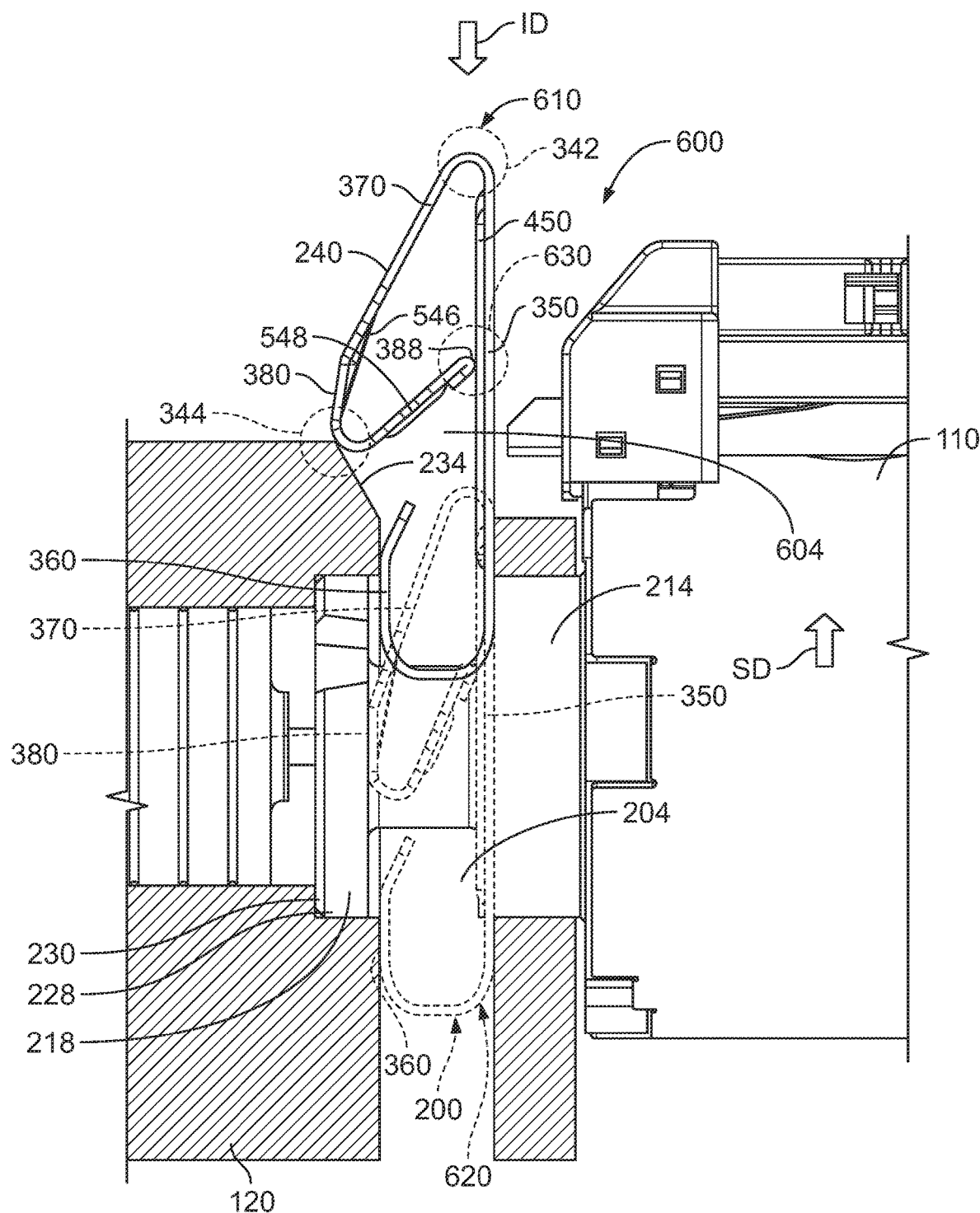
FIG. 6 is a sectional view similar to FIG. 2 depicting an assembly method of the valve assembly.

In the illustrative embodiment, the locating block 218 of the solenoid 110 is spaced from the block projection 214 of the solenoid 110 to define a gap 204 therebetween. The gap 204 is sized to receive the clip 240 as best seen in FIGS. 2 and 6. More specifically, in the assembled configuration 200 of the valve assembly 100, the clip 240 is retained in the gap 204 in engagement with the block projection 214, the locating block 218, and the valve body 120. To facilitate insertion of the clip 240 into the gap 204 during assembly of the valve assembly 100, the valve body 120 includes a chamfer 234. For the purposes of the present disclosure, the chamfer 234 may be referred to as a lead-in chamfer that facilitates insertion of the clip 240 into the gap 204.

The illustrative clip 240 is embodied as, or otherwise includes, any device capable of flexion and/or deformation in response to compressive forces applied thereto by the solenoid 110 (e.g., the block projection 214 and the locating block 218) and the valve body 120 during assembly of the valve assembly 100. In some embodiments, the clip 240 may have a one-piece, metallic construction. Additionally, in some embodiments, the clip 240 may have a one-piece, polymeric construction. Of course, it should be appreciated that in other embodiments, the clip 240 may be formed from one or more parts and may have another suitable construction. Furthermore, it should be appreciated that in some embodiments, the clip 240 may be embodied as, or otherwise include, one or more biasing elements.

Referring now to FIGS. 3-5, the clip 240 is depicted as an individual component removed from the valve assembly 100. For the sake of simplicity and clarity, features of the clip 240 are described in greater detail below with reference to FIGS. 3-5. Interaction between the features of the clip 240 and other components of the valve assembly 100 (i.e., the solenoid 110 and the valve body 120) when the assembly 100 is in the assembled configuration 200 are described below with reference to FIG. 2.

The illustrative clip 240 includes a spine 350, tangs 360, an overhang 370, and tabs 380 as shown in FIG. 3. The spine 350 illustratively defines a backbone or core section 352 of the clip 240. The tangs 360 are each embodied as, or otherwise include, generally C-shaped tangs that are appended to the spine 350. The overhang 370 extends over the tabs 380 and is appended to the spine 350 opposite the tangs 360. The tabs 380 are interconnected with the overhang 370 and extend inwardly away from the overhang 370 toward the spine 350. As described in greater detail below, when the valve assembly 100 is in the assembled configuration 200, the tabs 380 are configured to contact the locating block 218 of the solenoid 110 to cause the locating block 218 to abut the shoulder 230 of the valve body 120.

In the illustrative embodiment, the overhang 370 includes a bend 372 interconnected with the spine 350 adjacent an end 340 of the clip 240. The bend 372 and the spine 350 cooperate to define a bending region 342 adjacent the end 340. As described in greater detail below with reference to FIG. 6, during assembly of the valve assembly 100, the clip 240 is configured to bend, flex, or otherwise deform in the bending region 342 as the clip 240 is advanced into the gap 204 to enable the clip 240 to be retained in the gap 204 in engagement with the block projection 214, the locating block 218, and the valve body 120 in the assembled configuration 200 of the valve assembly 100.

Each of the illustrative tabs 380 includes a transition section 382. The transition section 382 of each tab 380 is interconnected with the overhang 370 and extends at an angle α relative to the overhang 370. The angle α is embodied as, or otherwise includes, an acute angle greater than zero degrees. Of course, it should be appreciated that in other embodiments, the angle α may be embodied as, or otherwise include, another suitable angle. In any case, in the illustrative embodiment, at least a portion of the transition section 382 of each tab 380 is generally not coplanar with the overhang 370.

Each of the illustrative tabs 380 includes a bend 384 interconnected with the transition section 382. The bend 384 of each tab 380 defines a bending region 344 of the clip 240. In some embodiments, the bending region 344 may be cooperatively defined by the bend 384 and the transition section 382 of each tab 380. Regardless, as described in greater detail below with reference to FIG. 6, during assembly of the valve assembly 100, the clip 240 is configured to bend, flex, or otherwise deform in the bending region 344 as the clip 240 is advanced into the gap 204 to enable the clip 240 to be retained in the gap 204 in engagement with the block projection 214, the locating block 218, and the valve body 120 in the assembled configuration 200 of the valve assembly 100.

Each of the illustrative tabs 380 includes an arm 386 interconnected with the bend 384 that terminates at a tip 388 of each tab 380. In the illustrative embodiment, each arm 386 extends inwardly toward the spine 350 such that each tab 380 extends inwardly toward the spine 350 from the bend 384 to the tip 388. Each tip 388 of each tab 380 includes a portion or segment 390 that is folded over a portion or segment 392 to provide a generally smooth contour. In that sense, each tip 388 may be embodied as, or otherwise include, a folded or completely bent tip. In any case, the tip 388 of each illustrative tab 380 is in contact with the spine 350 as described in greater detail below. Furthermore, as described in greater detail below with reference to FIG. 6, the tip 388 of each tab 380 is configured for slidable engagement with the spine 350 during assembly of the valve assembly 100.

The illustrative clip 240 includes stiffener features that are configured to provide increased stiffness and/or structural strength to the clip 240 to enable the clip 240 to withstand flexion, bending, and/or deformation during assembly of the valve assembly 100. In one respect, the clip 240 includes stiffener features (i.e., stiffener darts 546 shown in FIG. 5) that are included in, coupled to, or otherwise formed on, the transition sections 382 of the tabs 380. In another respect, the clip 240 includes stiffener features (i.e., stiffener beads 548 shown in FIG. 5) that are included in, coupled to, or otherwise formed on, the arms 386 of the tabs 380. In yet another respect, the clip 240 includes stiffener features (i.e., stiffener beads 450 shown in FIG. 4 and a stiffener arch 552 shown in FIG. 5) that are included in, coupled to, or otherwise formed on, the spine 350.

The illustrative spine 350 includes stiffener beads 450 that extend outwardly towards the tabs 380 as best seen in FIGS. 3 and 4. More specifically, each of the stiffener beads 450 is provided on, and extends outwardly from, an elongate stem 452 of the spine 350 that is interconnected with at least one of the tangs 360. Each stiffener bead 450 is arranged in contact with the tip 388 of one of the tabs 380 and configured for slidable engagement therewith as discussed below with reference to FIG. 6. In the illustrative embodiment, the stiffener beads 450 are embodied as, or otherwise include, a pair of stiffener beads each extending outwardly from a corresponding stem 452 of the spine 350. Of course, in other embodiments, it should be appreciated that the stiffener beads 450 may be embodied as, or otherwise include, another suitable number of stiffener beads each extending outwardly from another suitable location of the spine 350.

The illustrative tangs 360 each include a valve body engagement surface 460 that faces outwardly and is configured to contact the valve body 120 when the valve assembly 100 is in the assembled configuration 200. More specifically, the valve body engagement surface 460 of each tang 360 is configured to contact an exterior surface 220 of the valve body 120 when the valve assembly 100 is in the assembled configuration 200. In the assembled configuration 200 of the valve assembly 100, a segment 462 of the valve body engagement surface 460 of each tang 360 contacts the exterior surface 220 and extends parallel thereto. Additionally, in the assembled configuration 200 of the valve assembly 100, a segment 464 of the valve body engagement surface 460 of each tang 360 is spaced from the exterior surface 220 and extends inwardly therefrom at an angle θ relative thereto.

In the illustrative embodiment, the tangs 360 are embodied as, or otherwise include, a pair of tangs each interconnected with a corresponding stem 452 of the spine 350. Of course, in other embodiments, it should be appreciated that the tangs 360 may be embodied as, or otherwise include, another suitable number of tangs coupled to the spine 350 in another suitable manner. In any case, the tangs 360 cooperatively define an end 442 of the clip 240 that is arranged opposite the end 340.

The illustrative overhang 370 includes slots 472 located adjacent the end 340 of the clip 240. The slots 472 are embodied as, or otherwise include, any features capable of facilitating flexion of the clip 240 in the bending region 342 during assembly of the valve assembly 100. In the illustrative embodiment, the slots 472 are embodied as, or otherwise include, a pair of slots. Of course, it should be appreciated that in other embodiments, the slots 472 may be embodied as, or otherwise include, another suitable number of slots.

The overhang 370 and the tabs 380 illustratively cooperate to define voids 474 therebetween as best seen in FIG. 4. The voids 474 are capable of facilitating flexion of the clip 240 in the bending region 344 during assembly of the valve assembly 100. As such, the slots 472 and the voids 474 may be said to cooperatively facilitate deformation of the clip 240 during assembly of the valve assembly 100.

The illustrative tabs 380 each include a solenoid engagement surface 480 that faces outwardly and is configured to contact the solenoid 110 when the valve assembly 100 is in the assembled configuration 200. More specifically, the solenoid engagement surface 480 of each tab 380 is configured to contact the locating block 218 of the solenoid 110 when the valve assembly 100 is in the assembled configuration 200. The solenoid engagement surface 480 of each tab 380 is illustratively provided by the transition section 382. In the assembled configuration 200 of the valve assembly 100, at least part of the solenoid engagement surface 480 of each tab 380 contacts the locating block 218 and extends parallel thereto.

In the illustrative embodiment, the solenoid engagement surface 480 of each tab 380 is formed to include a dart depression 482 that extends inwardly into the transition section 382. Additionally, in the illustrative embodiment, the arm 386 of each tab 380 is formed to include a bead depression 484 that extends inwardly into the arm 386. Each dart depression 482 may correspond to, or otherwise be associated with, one of the stiffener darts 546 described below. Each bead depression 484 may correspond to, or otherwise be associated with, one of the stiffener beads 548 described below.

In the illustrative embodiment, the tabs 380 are embodied as, or otherwise include, a pair of tabs each interconnected with the overhang 370. Of course, in other embodiments, it should be appreciated that the tabs 380 may be embodied as, or otherwise include, another suitable number of tabs coupled to the overhang 370 in another suitable manner.

In addition to the pair of elongate stems 452, the illustrative spine 350 of the clip 240 includes a core arch 554 that extends between, and is interconnected with, the elongate stems 452 as best seen in FIG. 5. At least in some embodiments, the slots 472 may extend partway into, and be defined at least partially by, the core arch 554. In other embodiments, however, the slots 472 may be entirely defined by the overhang 370 such that the slots 472 do not extend partway into the core arch 554.

The illustrative spine 350 includes a pair of bead depressions 556 that each extend inwardly into a corresponding one of the stems 452. The bead depressions 556 may correspond to, or otherwise be associated with, the stiffener beads 450. In any case, the core arch 554 and one of the stems 452 cooperatively define each of the bead depressions 556. Each bead depression 556 extends along a bead depression axis BDA between termination points 558, 560 that are arranged opposite one another. In the illustrative embodiment, the termination point 558 of each bead depression 556 is arranged adjacent one of the slots 472 in a lengthwise direction LD, and the termination point 560 of each bead depression 556 is arranged adjacent one of the tangs 360 in the lengthwise direction LD.

The spine 350 of the clip 240 illustratively includes the stiffener arch 552 that is integrally formed with, defined by, or otherwise coupled to, the core arch 554. In some embodiments, the stiffener arch 552 may extend outwardly from the core arch 554. In any case, the stiffener arch 552, the core arch 554, and the bead depressions 556 are arranged on a side 560 of the spine 350. The stiffener beads 450 are arranged on a side 562 of the spine 350 that is arranged opposite the side 560.

In the illustrative embodiment, each of the transition sections 382 of the tabs 380 includes one of the stiffener darts 546 as shown in FIG. 5. In some embodiments, each of the stiffener darts 546 may extend over at least part of the transition section 382 of one tab 380 and over at least part of the overhang 370. In such embodiments, each stiffener dart 546 may be included in one of the tabs 380 and in the overhang 370. Regardless, each of the stiffener darts 546 is formed on an exterior surface 580 of each tab 380 that at least partially faces toward the spine 350. In some embodiments, the darts 546 may extend outwardly from the exterior surfaces 580 of the tabs 380 toward the spine 350.

In the illustrative embodiment, each of the arms 386 of the tabs 380 includes one of the stiffener beads 548 as shown in FIG. 5. In some embodiments, each of the stiffener beads 548 may extend between termination points 586, 588. In such embodiments, the termination point 586 may be arranged adjacent the bend 384 of the corresponding tab 380, whereas the termination point 588 may be arranged adjacent the tip 388 of the corresponding tab 380. Regardless, each of the stiffener beads 548 is formed on an exterior surface 590 of each tab 380 that is arranged opposite the corresponding exterior surface 580. In some embodiments, the beads 548 may extend outwardly from the exterior surfaces 590 of the tabs 380.

Referring now to FIG. 6, a method 600 of assembling the valve assembly 100 is illustrated with respect to an uninstalled position 610 of the clip 240 and an installed position 620 of the clip 240 (depicted in phantom). It should be appreciated that in the uninstalled position 610, the clip 240 is not positioned in the gap 204 such that the clip 240 contacts the solenoid 110 and the valve body 120 to cause the locating block 218 to abut the shoulder 230 of the valve body 120. Additionally, it should be appreciated that in the installed position 620, the clip 240 is positioned in the gap 204 such that the clip 240 contacts the solenoid 110 and the valve body 120 to cause the locating block 218 to abut the shoulder 230 of the valve body 120. As such, the installed position 620 of the clip 240 corresponds to, and is achieved in, the assembled configuration 200 of the valve assembly 100.

To assemble the valve assembly 100 according to the method 600, the solenoid 110 is positioned in proximity to the valve body 120 such that the locating block 218 is at least partially received by the groove 228 as shown in FIG. 6. Then, the clip 240 is inserted in the insertion direction ID into a gap 604 defined between the chamfer 234 of the valve body 120 and the solenoid 110 as shown in FIG. 6. Subsequently, the clip 240 is advanced through the gap 604 in the insertion direction ID until the clip 240 is arranged in the gap 204 in the installed position 620 as shown in FIG. 6. To advance the clip 240 through the gap 604 until the clip 240 is arranged in the gap 204 in the installed position 620, the solenoid 110 is contacted by the clip 240 to cause the locating block 218 to abut the shoulder 230 of the valve body 120 as shown in FIG. 6.

In the illustrative embodiment, when the clip 240 is advanced through the gap 604 in the insertion direction ID toward the installed position 620, bending of the clip 240 occurs in the bending regions 342, 344 as shown in FIG. 6. Additionally, when the clip 240 is advanced through the gap 604 in the insertion direction ID toward the installed position 620, sliding engagement between the tips 388 of the tabs 380 and the stiffener beads 450 occurs such that the tabs 380 slide along the beads 450 in a sliding region 630 as shown in FIG. 6. In some embodiments, the tabs 380 may slide along the beads in the sliding region 630 in a sliding direction SD that is substantially opposite the insertion direction ID as shown in FIG. 6. Regardless, when the clip 240 is advanced through the gap 604 until the clip 240 is arranged in the gap 204 in the installed position 620, the tabs 380 are engaged with, and in direct contact with, the valve body 120 as shown in FIG. 6.

Figure 7:
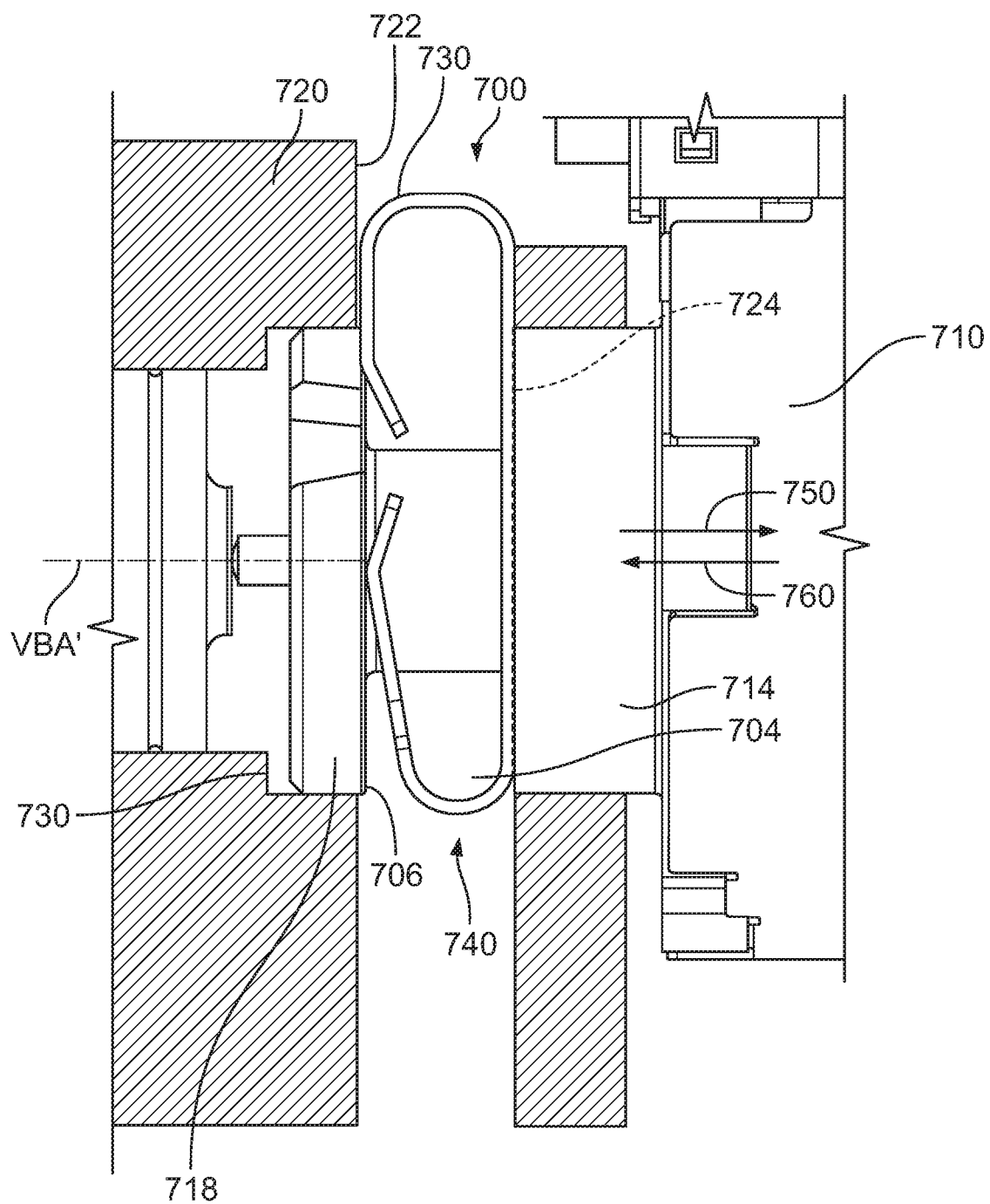
FIG. 7 is a sectional view of another valve assembly.

Referring now to FIG. 7, an illustrative valve assembly 700 includes a solenoid 710 substantially similar to the solenoid 110, a valve body 720 substantially similar to the valve body 120, and a clip 730. In an installed position 740 of the clip 730, the clip 730 contacts a block projection 714 of the solenoid 710, the valve body 720, and a locating block 718 of the solenoid 710. Notably, the locating block 718 is spaced from a shoulder 730 of the valve body 720 along a valve body axis VBA' defined by the valve body 720.

In the installed position 740 of the clip 730, the solenoid 710 is located by the position of the clip 730 without being located against a wall or a face. Consequently, movement of the clip 730 (e.g., due to compressive forces applied thereto and/or clip integrity) may cause corresponding movement of the solenoid 710. In some situations, movement of the solenoid 710 may occur in a direction indicated by arrow 750. Additionally, in some situations, movement of the solenoid 710 may occur in a direction indicated by arrow 760 that is substantially opposite the direction 750. Such movement in the directions 750, 760 may add to the operating positions of a spool 702 housed in the valve body 720, thereby introducing complications during operation of the valve assembly 700.

In some configurations (e.g., in the installed position 740 of the clip 730 in the valve assembly 700), a retaining clip (e.g., the clip 730) may position an outer wall (e.g., a wall 722) of a valve body (e.g., the valve body 720) substantially coplanar with an outermost portion (e.g., a portion 706) of a clip retaining pocket (e.g., a gap or pocket 704 defined between the locating block 718 and the block projection 714) of a trim solenoid (e.g., the solenoid 710). Such positioning may be associated with a number of issues. In one respect, the solenoid may not be designed to locate from the outermost portion of the clip retaining pocket, and the outermost portion may not provide a datum plane. Locating the solenoid from a non-datum surface may add unnecessary tolerances from the outermost portion to an actuator pin (e.g., the pin 219) that actuates a valve (e.g., the spool 202). Those tolerances may be added to various valve locations during normal operations, which may undesirably impact the performance of a transmission. In another respect, the retaining clip may not locate the trim solenoid (e.g., the locating block 718) against a wall (e.g., the shoulder 730). As a result, the trim solenoid may move axially in a positive direction (e.g., in the direction 750) and in a negative direction (e.g., in the direction 760) with flexing of the retaining clip.

In one configuration (e.g., in the installed position 740 of the clip 730 in the valve assembly 700) of the present disclosure, the solenoid may be designed for location from a first datum plane (e.g., a datum plane 724 defined by the block projection 714) such that unnecessary manufacturing tolerances may impact the size and/or performance of the valve assembly. In another configuration (e.g., in the assembled configuration 200 of the valve assembly 100), the solenoid may be designed for location from a second datum plane (e.g., a datum plane 221 defined by the locating block 718) such that the unnecessary manufacturing tolerances may be avoided.

The retaining clip of the present disclosure may include a number of unique features. In one example, the clip may include beads (e.g., the beads 450, 548) and darts (e.g., the darts 546) that prevent, or otherwise substantially resist, undesirable bending, twisting, or stretching. In another example, the clip may include bending calibration slots (e.g., the slots 472) that may be configured/adjusted to withstand a predetermined bending force/moment for a particular application. In yet another example, the clip may include a full bend (e.g., the folded tips 388 of the tabs 380) to avoid gouging, among other things. In yet another example still, the clip may include beads (e.g., the beads 450) to provide increased stiffness and avoid gouging, among other things. Further, in another example, the clip may include a number of features (e.g., the tips 388 and the beads 450) that cooperate to provide a sliding mechanism that may increase the compression force of the clip to facilitate securement of the solenoid against the datum wall (e.g., the locating block 218). Further, in yet another example, the clip may include an upper bending area (e.g., the bending region 342) and stiffeners (e.g., the beads 450) that provide increased stiffness to withstand and/or accommodate bending in the upper bending area. Further, in yet another example still, the clip may include a lower bending area (e.g., the bending region 344) and stiffeners (e.g., the darts 546 and/or the beads 548) that provide increased stiffness to withstand and/or accommodate bending in the lower bending area. Finally, the clip may include contact tabs (e.g., the tabs 380) to directly contact or engage the structure defining the datum wall.

Upon installation of the retaining clip of the present disclosure, a number of features (e.g., the bend 372, the beads 450, and the bend 384) of the clip may cooperate to apply a force on the solenoid (e.g., the locating block 218) to locate and retain the solenoid in position relative to the valve body. Additionally, upon installation of the retaining clip of the present disclosure, stiffeners (e.g., the beads 450, the darts 546, and/or the beads 548) may cooperate to ensure that the tabs (e.g., the tabs 380) of the retaining clip are coplanar with the solenoid face (e.g., the locating block 218).

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A valve assembly comprising:
   a solenoid;
   a valve body coupled to the solenoid that extends along a valve body axis, wherein the valve body includes a first inner surface that defines an interior passage having a first diameter, a second inner surface that defines a groove in fluid communication with the interior passage which has a second diameter greater than the first diameter, and a shoulder defined at an interface between the first inner surface and the second inner surface; and
   a clip coupled to the solenoid and the valve body, wherein the clip is arranged in contact with the solenoid to cause the solenoid to directly abut the shoulder of the valve body such that the solenoid is constrained against movement along the valve body axis toward the interior passage,
   wherein a locating block of the solenoid is sized to be positioned in the groove such that the locating block abuts the shoulder of the valve body.

2. The valve assembly of claim 1 wherein the locating block is spaced from a block projection of the solenoid to define a gap therebetween, and wherein the clip is retained in the gap in engagement with the block projection.

3. The valve assembly of claim 2, wherein the valve body includes a chamfer to facilitate insertion of the clip into the gap.

4. The valve assembly of claim 1, wherein the clip includes a spine and a pair of generally C-shaped tangs appended to the spine, wherein each said tang includes a valve body engagement surface that contacts an exterior surface of the valve body, and wherein part of each said valve body engagement surface extends parallel to the exterior surface.

5. The valve assembly of claim 4, wherein the clip includes an overhang appended to the spine opposite the pair of tangs and a pair of tabs interconnected with the overhang, wherein each said tab includes a solenoid engagement surface that contacts the locating block of the solenoid, and wherein part of each said solenoid engagement surface extends parallel to, and is in contact with, a rear surface of the locating block.

6. The valve assembly of claim 5, wherein each said tab includes a tip interconnected with the solenoid engagement surface by a bend, and wherein each said tab extends inwardly toward the spine from the bend to the tip.

7. The valve assembly of claim 6, wherein the tip of each said tab includes a first portion folded over a second portion to provide a generally smooth contour.

8. The valve assembly of claim 1, wherein the clip includes a spine, a pair of generally C-shaped tangs appended to the spine, an overhang appended to the spine opposite the pair of tangs, and a pair of tabs interconnected with the overhang that extend inwardly toward the spine.

9. The valve assembly of claim 8, wherein the overhang includes a pair of slots to facilitate flexion of the clip in use of the valve assembly, and wherein the spine includes a stiffener bead that extends outwardly toward each said tab and provides increased stiffness to the clip.

10. The valve assembly of claim 9, wherein the pair of tabs are arranged in contact with the stiffener bead.

11. A clip adapted for use in a valve assembly, the clip comprising:
    a spine;
    a pair of generally C-shaped tangs appended to the spine;
    an overhang appended to the spine opposite the pair of tangs; and
    a pair of tabs interconnected with the overhang that extend inwardly toward the spine,
    wherein, in use of the clip, the pair of tabs are configured to contact a solenoid of the valve assembly to cause the solenoid to abut a shoulder of a valve body of the valve assembly, and
    wherein the spine includes a stiffener arch to provide increased stiffness to the clip.

12. The clip of claim 11, wherein the spine includes a stiffener bead arranged opposite the stiffener arch that extends outwardly toward each tab and provides increased stiffness to the clip.

13. The clip of claim 11, wherein each tab includes a stiffener dart to provide increased stiffness to the clip that is formed on a first exterior surface of the pair of tabs at least partially facing toward the spine.

14. The clip of claim 13, wherein each tab includes a stiffener bead to provide increased stiffness to the clip that is formed on a second exterior surface of the pair of tabs arranged opposite the first exterior surface.

15. The clip of claim 11, wherein:
    the overhang includes a pair of slots to facilitate flexion of the clip in use thereof;
    each tab includes an arcuate bend and a tip interconnected with the arcuate bend;
    each said tab extends inwardly toward the spine from the arcuate bend to the tip;
    the tip of each said tab includes a first portion folded over a second portion to provide a generally smooth contour; and
    the tip is configured for slidable engagement with the spine in use of the clip.

* * * * *